(12) United States Patent
Toms et al.

(10) Patent No.: US 10,948,462 B1
(45) Date of Patent: Mar. 16, 2021

(54) AUTOMATIC COLUMN SPARGING FOR PRECONCENTRATION COLUMNS

(71) Applicant: Elemental Scientific, Inc., Omaha, NE (US)

(72) Inventors: Andrew D. Toms, Guelph (CA); Michael P. Field, Papillion, NE (US); Nathan Saetveit, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 146 days.

(21) Appl. No.: 16/391,993

(22) Filed: Apr. 23, 2019

Related U.S. Application Data

(60) Provisional application No. 62/661,397, filed on Apr. 23, 2018.

(51) Int. Cl.
*G01N 30/06* (2006.01)
*G01N 30/20* (2006.01)
*G01N 30/02* (2006.01)

(52) U.S. Cl.
CPC ............ *G01N 30/20* (2013.01); *G01N 30/06* (2013.01); *G01N 2030/025* (2013.01)

(58) Field of Classification Search
CPC .. G01N 30/20; G01N 30/06; G01N 2030/025; G01N 30/24; G01N 30/02; G01N 2030/027; G01N 2030/402; G01N 30/50
USPC ......... 73/23.42, 61.56; 210/656; 422/70, 86; 96/101–107; 134/22.1, 22.18, 56 R, 99.1, 134/100.1, 104.1, 169 C, 166 C
See application file for complete search history.

(56) References Cited

U.S. PATENT DOCUMENTS

| | | | | |
|---|---|---|---|---|
| 6,152,989 A * | 11/2000 | Ogawa | ................. | B01D 1/00 95/245 |
| 2014/0305195 A1* | 10/2014 | Blaschyk | ............... | G01N 30/32 73/61.56 |

* cited by examiner

*Primary Examiner* — Robert R Raevis
(74) *Attorney, Agent, or Firm* — Kevin E. West; Advent, LLP

(57) ABSTRACT

The present disclosure is directed to systems and methods for automated column sparging of preconcentration columns for analytic testing. A system embodiment includes, but is not limited to, a selection valve fluidically coupled with a gas source and with an eluent source, the selection valve including a mixing portion to mix gas from the gas source and eluent from the eluent source to provide a bubbled eluent stream; and a preconcentration column in fluid communication with the selection valve, the preconcentration column configured to receive the bubbled eluent stream from the selection valve and direct the bubbled eluent stream into an interior of the preconcentration column.

20 Claims, 12 Drawing Sheets

US 10,948,462 B1

AUTOMATIC COLUMN SPARGING FOR PRECONCENTRATION COLUMNS

CROSS-REFERENCE TO RELATED APPLICATIONS

The present application claims the benefit of 35 U.S.C. § 119(e) of U.S. Provisional Application Ser. No. 62/661,397 filed Apr. 23, 2018, and titled "AUTOMATIC COLUMN SPARGING FOR PRECONCENTRATION COLUMNS." U.S. Provisional Application Ser. No. 62/661,397 is herein incorporated by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. Prior or during transportation of the aliquot to the nebulizer, the sample aliquot may be mixed with hydride generation reagents and fed into a hydride gas/liquid separator that channels hydride and/or sample gas into the nebulizer. The aerosol generated by the nebulizer is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

The present disclosure is directed to systems and methods for automated column sparging of preconcentration columns for analytic testing. A system embodiment includes, but is not limited to, a selection valve fluidically coupled with a gas source and with an eluent source, the selection valve including a mixing portion to mix gas from the gas source and eluent from the eluent source to provide a bubbled eluent stream; and a preconcentration column in fluid communication with the selection valve, the preconcentration column configured to receive the bubbled eluent stream from the selection valve and direct the bubbled eluent stream into an interior of the preconcentration column.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1A:
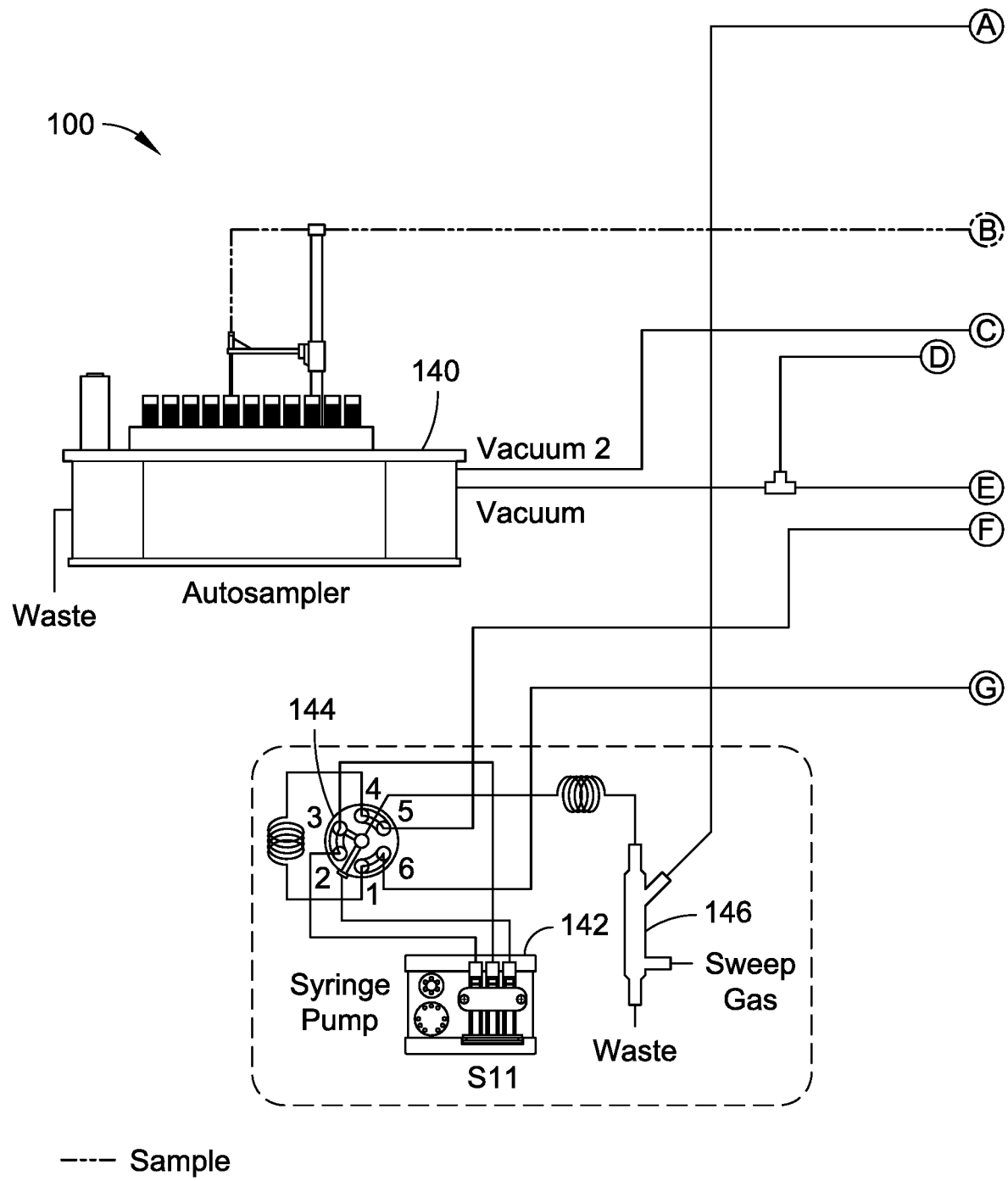
FIGS. 1A and 1B are schematics of an auto-sampling system operating in a sample loading mode, in accordance with an embodiment of this disclosure.
Figure 1B:
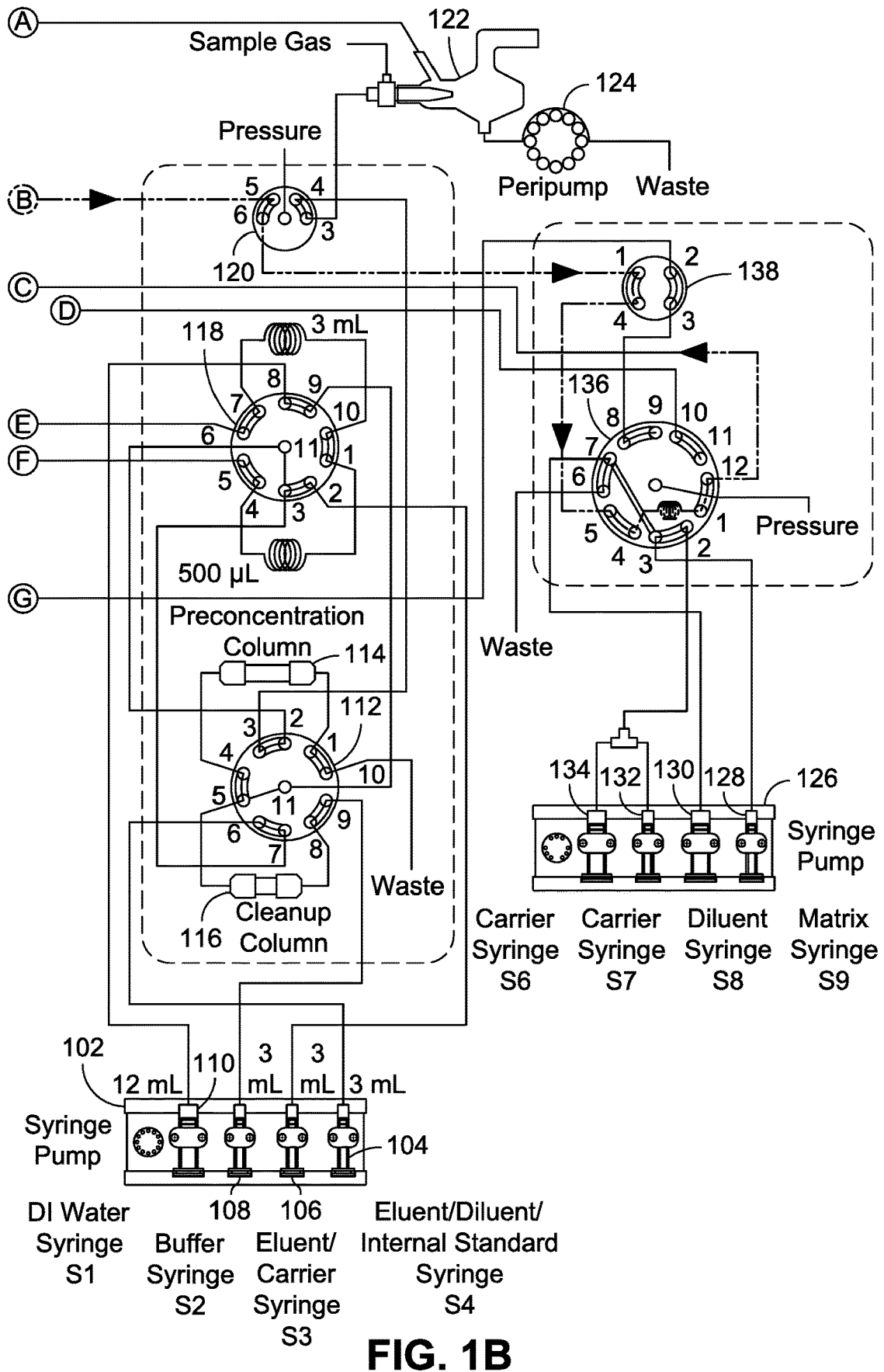
Figure 2A:
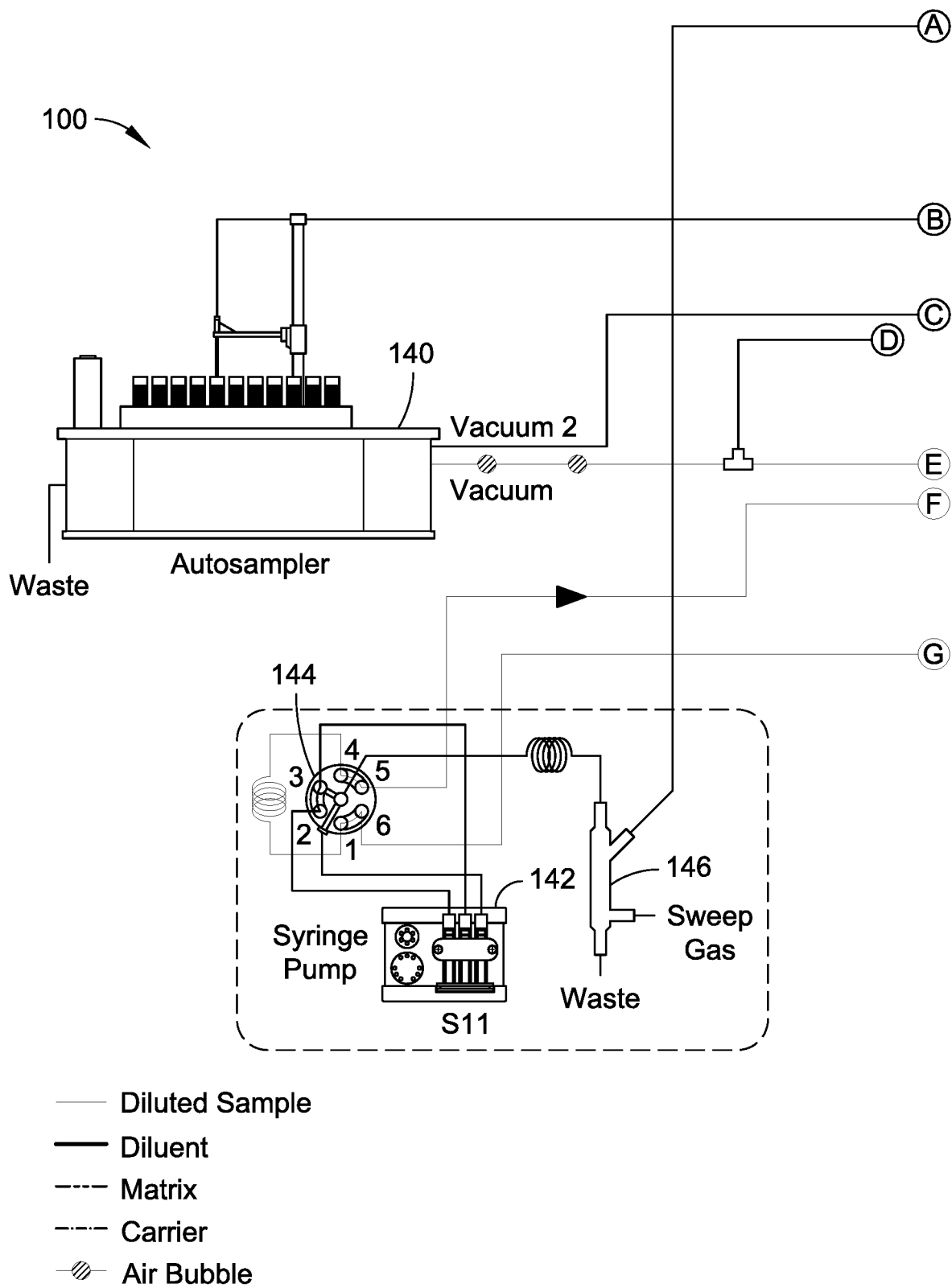
FIGS. 2A and 2B are schematics of an auto-sampling system operating in a sample dilution, matrix matching mode, in accordance with an embodiment of this disclosure.
Figure 2B:
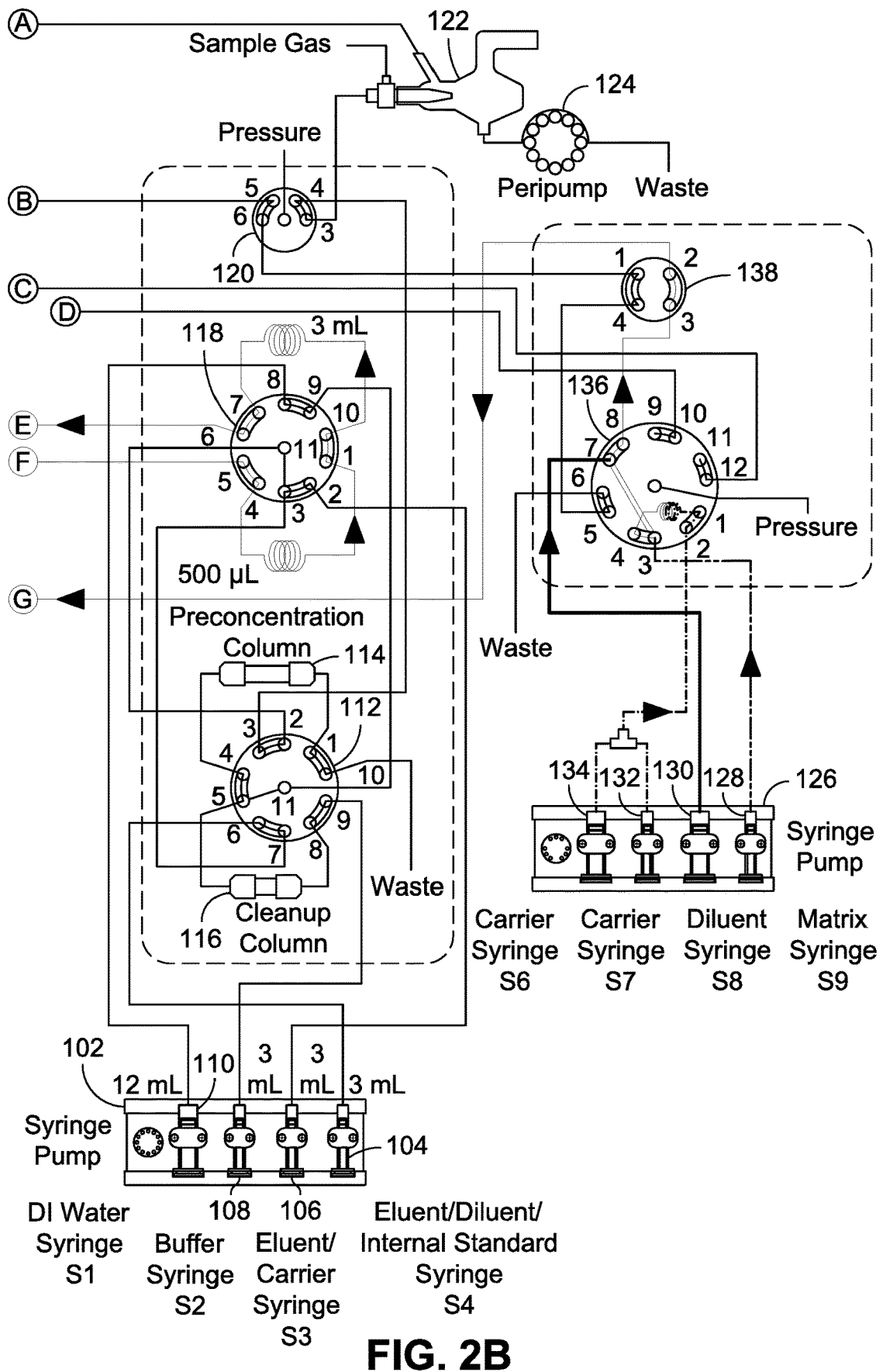
Figure 3A:
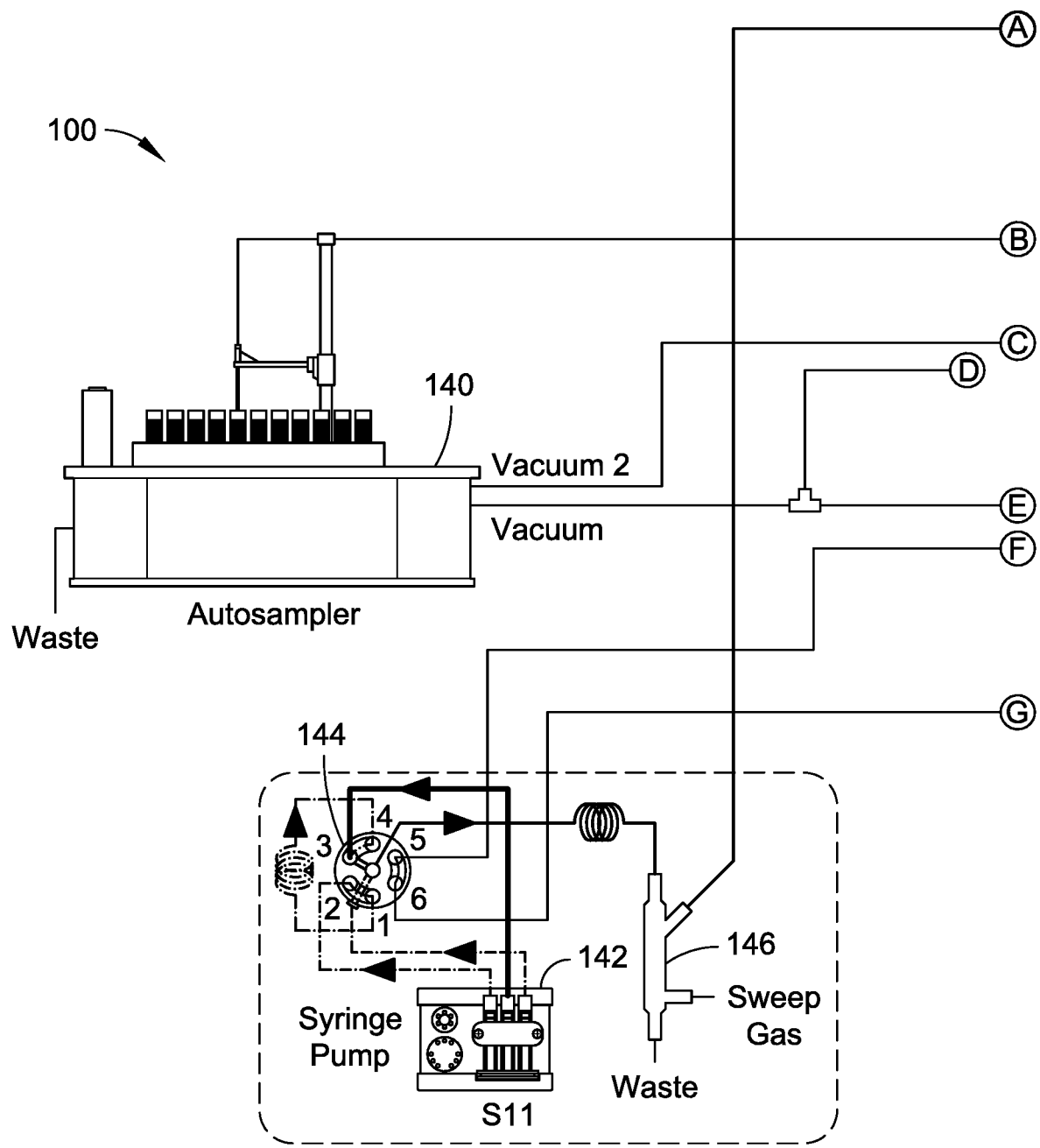
FIGS. 3A and 3B are schematics of an auto-sampling system operating in a hydride and/or direct dilution mode and/or preconcentration column loading and matrix removal, in accordance with an embodiment of this disclosure.
Figure 3B:
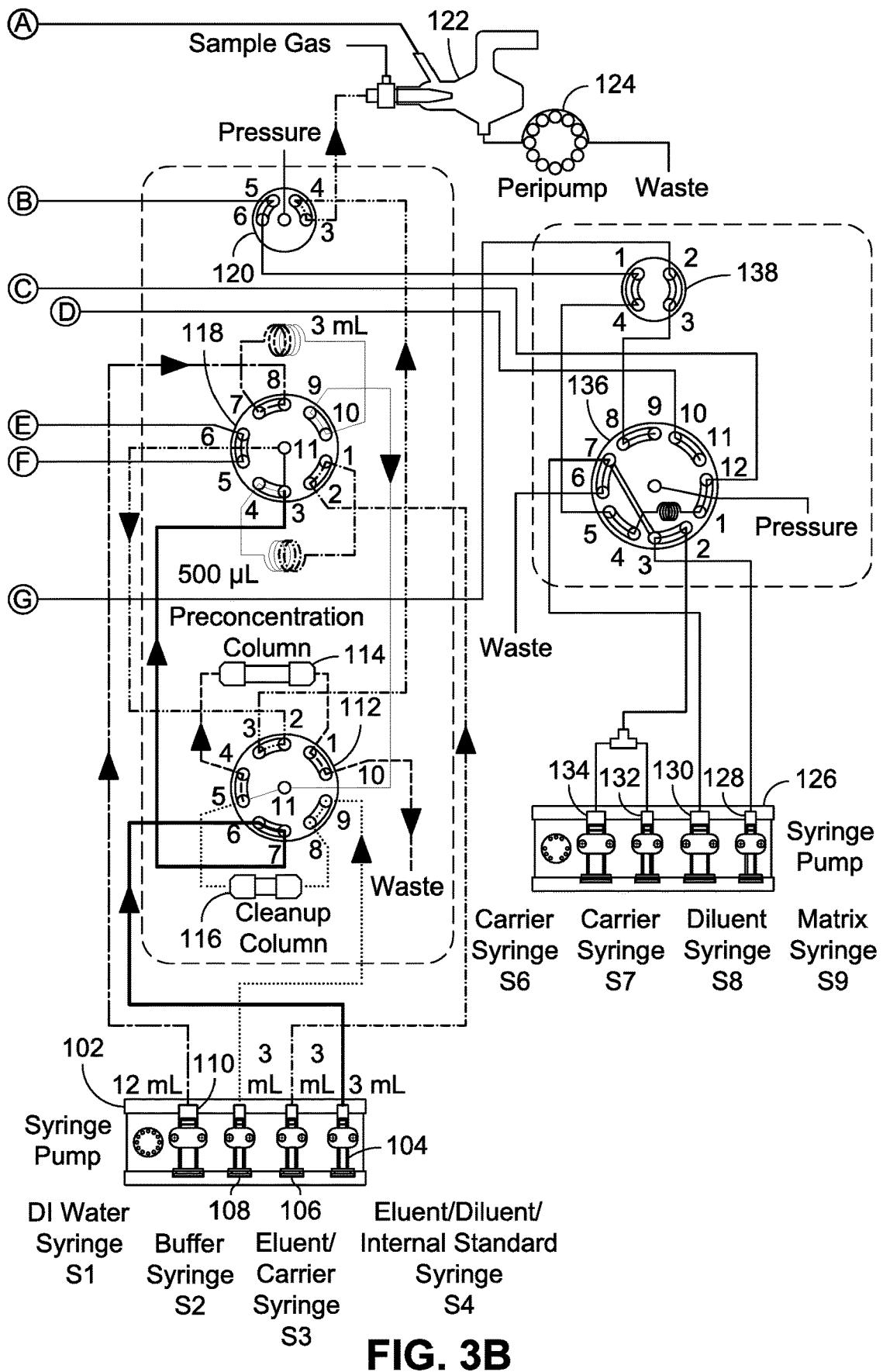
Figure 4A:
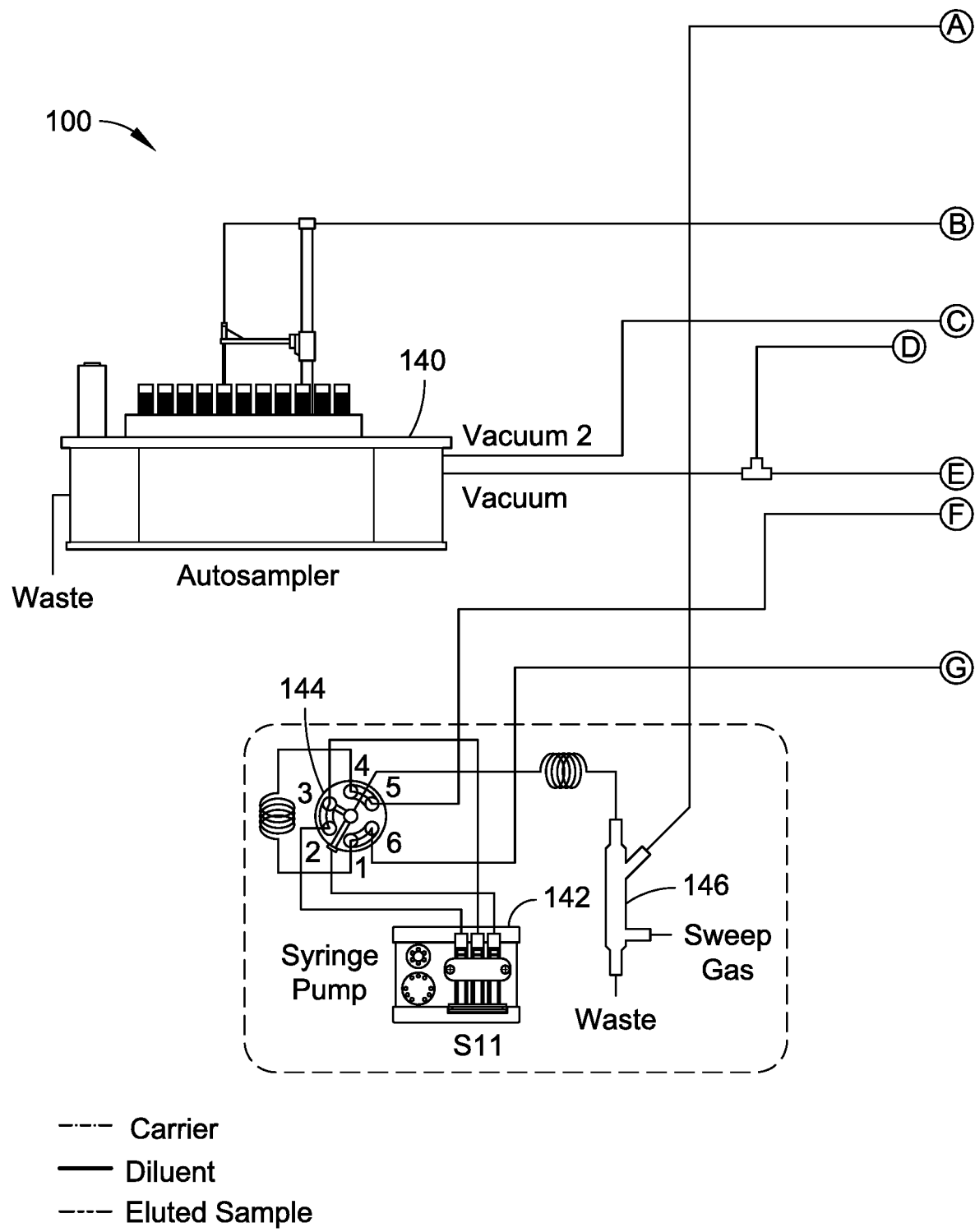
FIGS. 4A and 4B are schematics of an auto-sampling system operating in a preconcentration mode for analyte elution and column cleaning, in accordance with an embodiment of this disclosure.
Figure 4B:
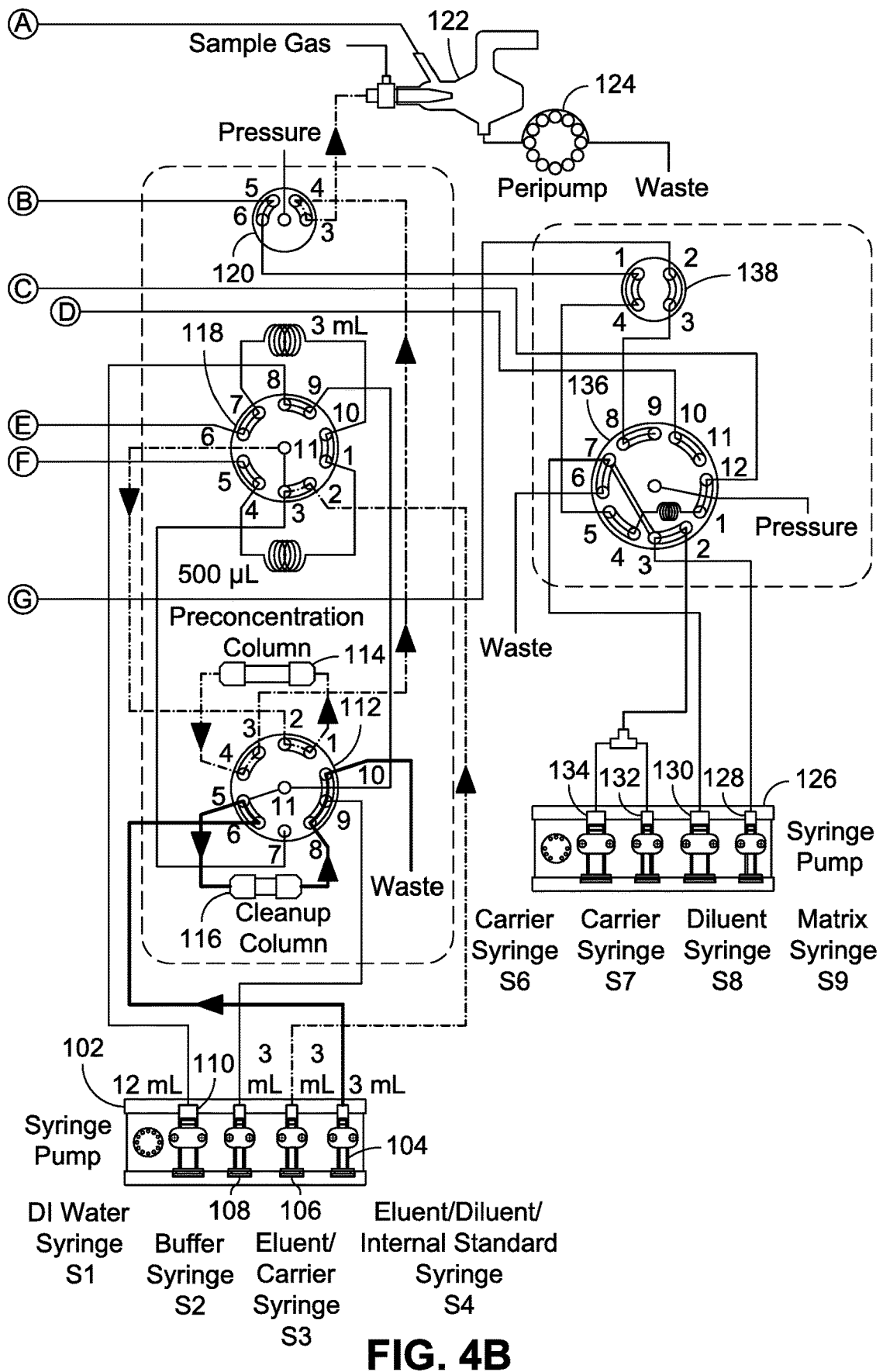

Determination of trace elemental concentrations or amounts in a sample can provide an indication of purity of the sample, or an acceptability of the sample for use as a reagent, reactive component, or the like. For instance, in certain production, manufacturing, or environmental processes (e.g., mining, metallurgy, semiconductor fabrication, pharmaceutical processing, environmental testing, etc.), the tolerances for impurities can be very strict, for example, on the order of fractions of parts per billion. To assist with preparing a sample for analysis, certain separation processes can be utilized. For example, sample separation columns are utilized in certain analytic systems to separate various components from each other on a time basis. The columns can include one or more resins within a flow path through the column to interact with the sample and induce the separation, such as through chemical interactions between the resin and one or more sample components, through influencing flow characteristics through the column, or the like, or combinations thereof. The column resin can be rinsed, cleaned, or removed between sample treatments (e.g., via a washout process), which can provide a fresh resin available to interact with a subsequent sample, however carryover of certain sample components within the column interior or bound to residual resin within the column interior can be a concern for contamination of future samples to be tested.

Accordingly, the present disclosure is directed, at least in part, to systems and methods for automatic column sparging of preconcentration columns for analytic testing. The column sparging is facilitated by introducing an eluent solution having gas bubbles therein to a preconcentration column to improve washout and reduce carryover of contaminants for trace elemental determination. The preconcentration column is utilized to concentrate analytes of interest from a particular volume of sample within the column prior to elution and transfer to an analytic system, such as to improve detection of trace analytes of interest in the sample. The gas bubbles can be introduced to the eluent stream through introduction of a gas and an eluent stream to a mixing port of a valve (e.g., a rotary valve) where the introduction can be facilitated by a variety of techniques including, but not limited to, syringe-driven gas mixing with syringe-driven eluent, pressurized gas mixing with syringe-driven eluent, peristaltic pump-driven gas with syringe-driven eluent, introducing a gas/liquid segmented stream, or combinations thereof.

Example Implementations

FIGS. 1A through 5B and 7 illustrate an auto-sampling system 100 in accordance with various embodiments of this disclosure, wherein the auto-sampling system 100 includes syringe, valve, and control logic configurations that allow automatic, inline matrix matching of calibration standards to samples and automatic column sparging of preconcentration columns for analytic testing. Those skilled in the art will appreciate that the embodiments illustrated in the drawings and/or described herein may be modified or fully or partially combined to result in additional embodiments. Accordingly, the illustrated and described embodiments should be understood as explanatory and not as limitations of the present disclosure.

Figure 5A:
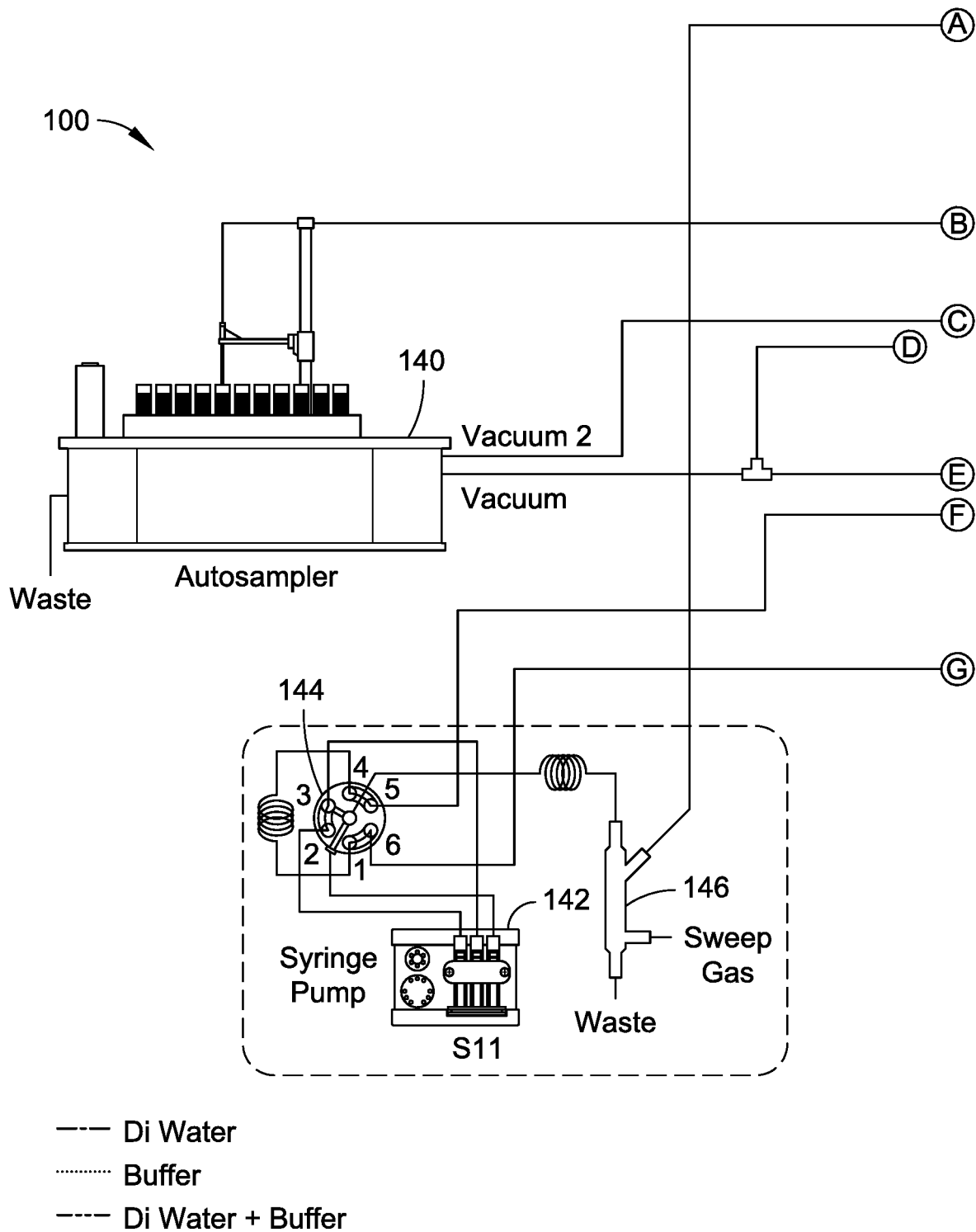
FIGS. 5A and 5B are schematics of an auto-sampling system operating in a column conditioning mode, in accordance with an embodiment of this disclosure.
Figure 5B:
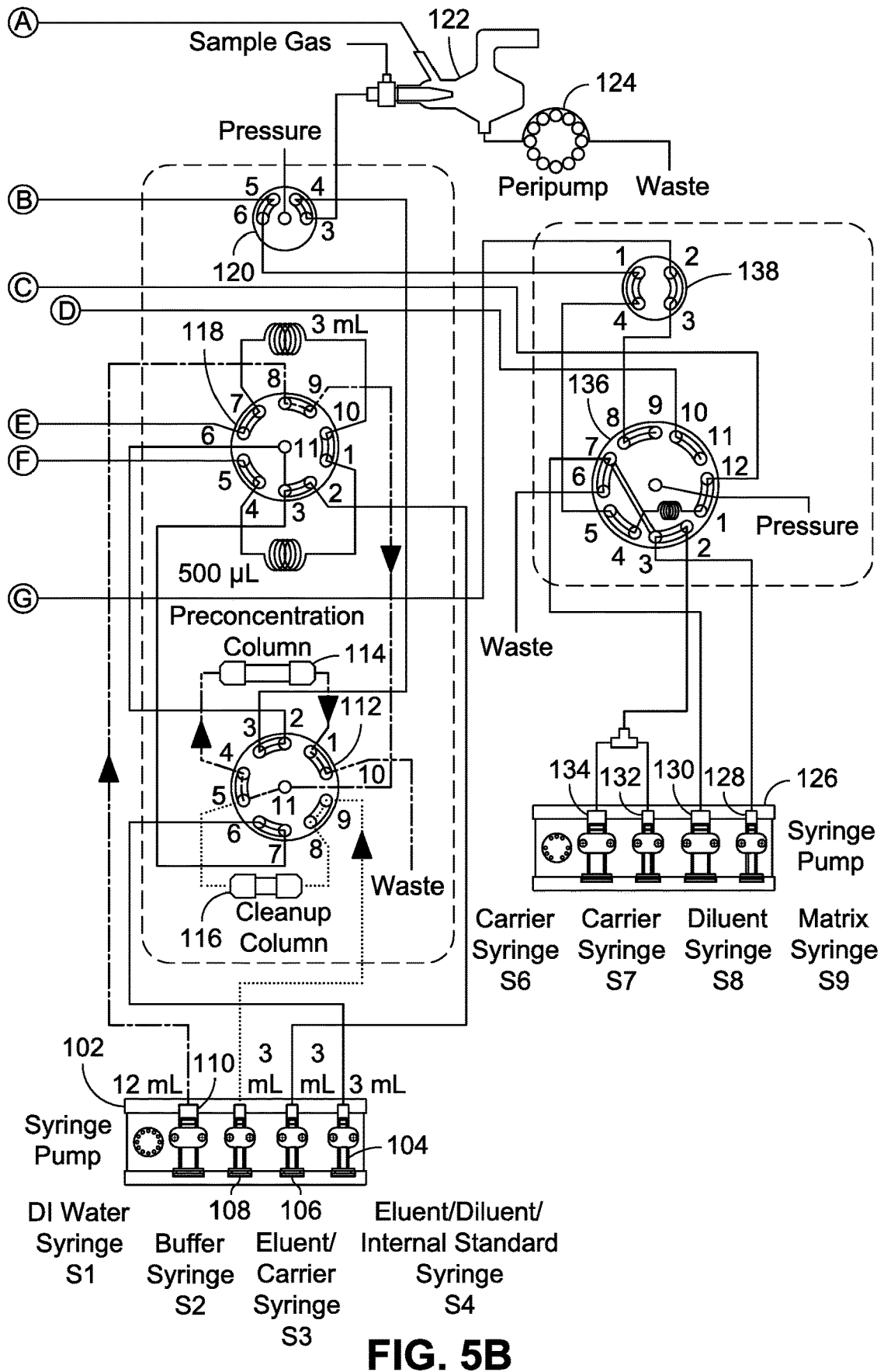
Figure 7:
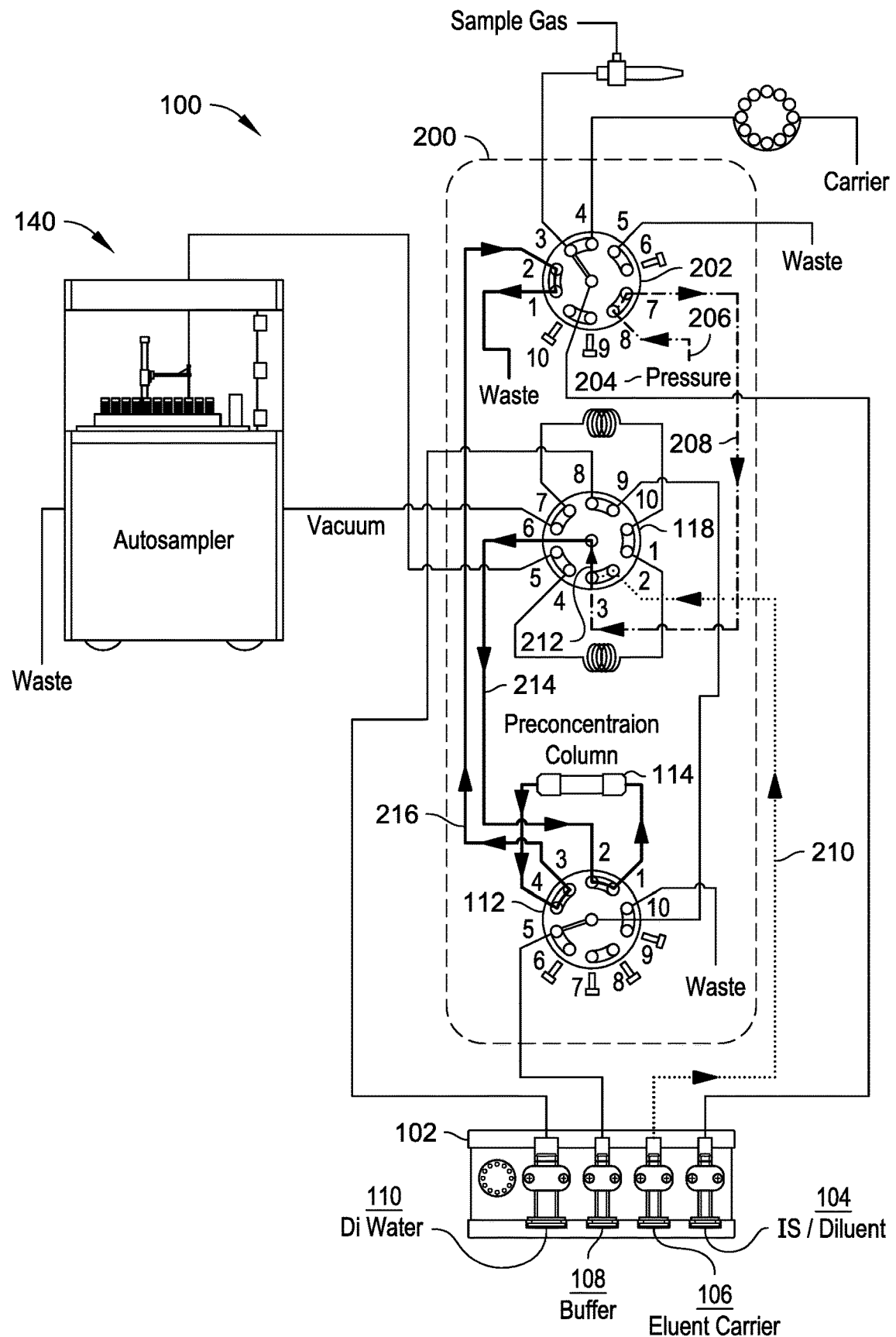
FIG. 7 is a schematic of an auto-sampling system operating in an automatic column sparging mode, in accordance with an embodiment of this disclosure.

Example modes of operation are shown in FIGS. 1A through 5B and 7. For example, FIGS. 1A and 1B illustrate the auto-sampling system 100 operating in a sample loading mode. FIGS. 2A and 2B illustrate the auto-sampling system 100 operating in a sample dilution, matrix matching mode. FIGS. 3A and 3B illustrate the auto-sampling system 100 operating in a hydride and/or direct dilution mode and/or preconcentration column loading and matrix removal. FIGS. 4A and 4B illustrate the auto-sampling system 100 operating in a preconcentration mode for analyte elution and column cleaning. FIGS. 5A and 5B illustrate the auto-sampling system 100 operating in a column conditioning mode. FIG. 7 illustrates an auto-sampling system 100 in an embodiment operating in an automatic column sparging mode.

In the embodiments illustrated in FIGS. 1A through 5B, the auto-sampling system 100 is shown to include a first syringe pump 102 that controls and/or physically supports a syringe 104 (e.g., a 3 mL syringe) configured to drive an eluent, diluent, or internal standard, a syringe 106 (e.g., a 3 mL syringe) configured to drive an eluent or a carrier, a syringe 108 (e.g., a 3 mL syringe) configured to drive a buffer, and a syringe 110 (e.g., a 12 mL syringe) configured to drive deionized (Di) water. In some embodiments, syringes 104, 106, 108, and 110 can be controlled by respective (independent) syringe pumps or at least one of syringes 104, 106, 108, and 110 can be controlled by a first pump or pump controller, at least one of syringes 104, 106, 108, and 110 can be controlled by a second pump or pump controller, and so forth. This applies to any other syringe pump configurations described herein.

Syringes 104 and 108 may be fluidically coupled to a selection valve 112 (e.g., an automated selection/selector valve), and syringes 106 and 110 may be fluidically coupled to another (second) selection valve 118. Selection valve 112 can also be coupled to a preconcentration column 114, a trace metals cleanup column 116, a waste line and/or receptacle, selection valve 118, and another (third) selection valve 120. Selection valve 118 can also be coupled to a sampling device 140 and another selection valve 144. In embodiments, selection valve 144 is coupled to a hydride syringe pump 142 that can control syringes configured to drive hydride generation reagents (e.g., HCl and NaBH$_4$) and a carrier. Selection valve 144 can also be coupled with a gas/liquid separator 146 configured to isolate gaseous or aerosolized substances from the selection valve 144 and direct the gaseous or aerosolized substances to a spray chamber 122.

The spray chamber 122 is also configured to receive one or more sample substances from the sampling device 140 (e.g., automated sampling device), wherein the one or more sample substances can be received via selection valve 120, directly from the sampling device 140 or after the one or more sample substances have been directed through a mixing path defined by the network of selection valves. In some embodiments, a nebulizer is coupled to or included within the spray chamber 122 to aerosolize substances received from selection valve 120. The spray chamber 122 can also be coupled to a waste line and/or receptacle, where waste materials can be removed from the spray chamber by a pump 124 (e.g., peristaltic pump) coupled to the waste line. The spray chamber 122 can be included within or coupled to an analysis instrument, such as an ICP spectrometry instrument (e.g., ICP-MS, ICP-OES, ICP-AES, or the like). The spray chamber 216 may be configured to direct at least a portion of the one or more sample substances (e.g., gaseous or aerosolized sample substances) to an analysis site (e.g., torch or plasma site) of the analysis instrument.

In embodiments, the auto-sampling system 100 also includes syringe and valve configurations (and control logic, e.g., program instructions executable by a processor from a non-transitory computer readable carrier medium) that allow automatic, inline matrix matching of calibration standards to samples. For example, the system 100 includes another syringe pump 126 controlling a syringe 128 configured to drive a matrix solution, a syringe 130 configured to drive diluent, and one or more syringes 132 and/or 134 configured to drive carrier solution(s). Syringes 128, 130, 132, and 134 can be coupled to a selection valve 136. Selection valve 136 can also be coupled with a waste line and/or receptacle, a gas (e.g., Ar or N$_2$) source, another selection valve 138, and with the sampling device 140. Selection valve 138 may also be coupled with selection valve 120 (connecting to spray chamber 122) and with selection valve 144 (connecting to hydride syringe pump 142).

In some embodiments, the inline matrix matching is implemented by at least three independent syringes (i.e., syringes 128, 130, and 132 and/or 134) connected to a valve system (i.e., selection valve 136 and other fluidically coupled selection valves) to dynamically introduce carrier, diluent, and ultrapure stock matrix flows for each blank/standard/sample. Some example implementations include the following:

1) For "clean" stock calibration standard, blank, QC standards, or samples: Carrier+Matrix; Matrix flow rate set to achieve a pre-set final matrix concentration.
2) For samples that have matrix less than the pre-set matrix concentration, but more than "0" matrix: Carrier+Diluent+Matrix; Matrix addition is reduced as necessary.
3) For samples already containing at least the pre-set matrix concentration and analyzed undiluted: Carrier+

Diluent. Diluent makes up the volume necessary to achieve the same total volume as condition #1.

4) For samples containing the pre-set matrix concentration but automatically diluted inline (which also dilutes the sample matrix): Same as condition #2.

5) For samples containing more than the pre-set matrix concentration, but automatically diluted inline (which also dilutes the sample matrix): Same as condition #2 OR condition #3.

This auto matrix matching functionality allows QC blanks and standards to be auto-calibrated and run from clean solutions (e.g., 1% nitric acid), while running real-world samples with high matrix. At the instrument (e.g., analysis instrument receiving one or more sample substances from spray chamber 122), all samples have a similar matrix composition, which allows more accurate quantification of the analytes detected by the instrument.

Figure 6:
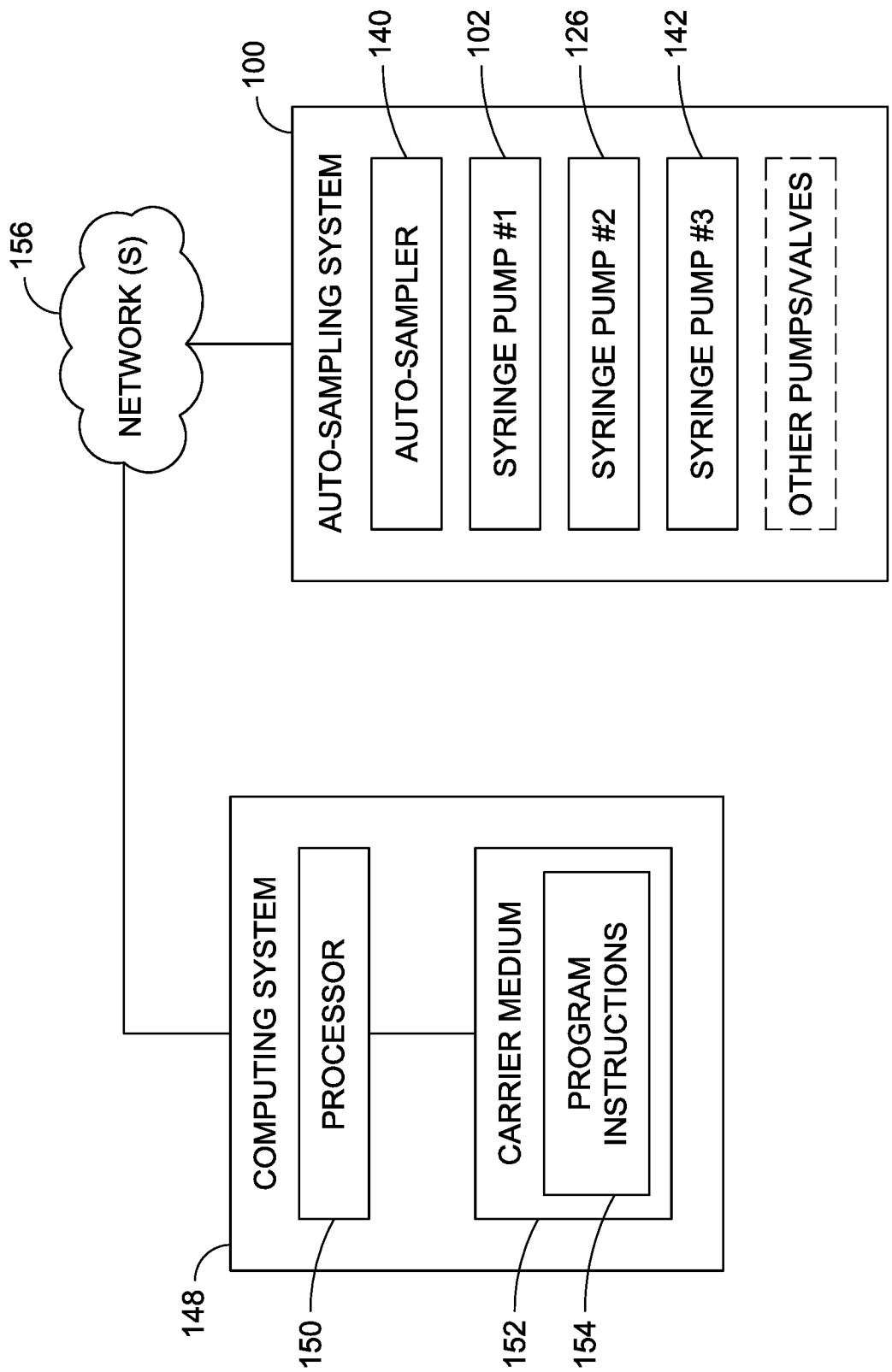
FIG. 6 is a block diagram illustrating a computing system for controlling an auto-sampling system, such as the auto-sampling systems shown in FIGS. 1A through 5B and FIG. 7.

Electromechanical devices (e.g., electrical motors, servos, actuators, or the like) may be coupled with or embedded within the selection valves, pumps, and other components of the system 100 to facilitate automated operation via control logic embedded within or externally driving the system 100. For example, the electromechanical devices can be configured to cause the plurality of valves to direct fluid flows from syringes 128, 130, 132, and 134, and from other syringes, flow paths, etc., according to one or more modes of operation, such as those described with respect to FIGS. 1A through 5B and 7. As shown in FIG. 6, the auto-sampling system 100 may be controlled by a computing system 148 having a processor 150 configured to execute computer readable program instructions 154 (i.e., the control logic) from a non-transitory carrier medium 152 (e.g., storage medium such as a flash drive, hard disk drive, solid-state disk drive, SD card, optical disk, or the like). The computing system 148 can be connected to various components of the auto-sampling system 100, either by direct connection, or through one or more network connections 156 (e.g., local area networking (LAN), wireless area networking (WAN or WLAN), one or more hub connections (e.g., USB hubs), and so forth). For example, the computing system 148 can be communicatively coupled to the sampling device 140, syringe pump 102, syringe pump 126, syringe pump 142, and any of the various pumps or selection valves described herein. The program instructions 154, when executing by processor 150, can cause the computing system 148 to control the auto-sampling system 100 (e.g., control the pumps and selection valves) according to one or more modes of operation, as described herein.

In some embodiments, a first mode of operation is associated with one or more stock calibration standards, blanks, quality control standards, or samples. In the first mode of operation, selection valve 136 and other fluidically coupled valves regulate fluid flow of the carrier solution from syringe 132 and/or syringe 134 and the matrix solution from syringe 128. In the first mode of operation, the computing system 148 can be configured to select a fluid flow rate of the matrix solution that achieves a pre-set final matrix concentration.

In some embodiments, a second mode is associated with one or more samples containing matrix solution below a pre-set matrix concentration. In the second mode of operation, selection valve 136 and other fluidically coupled valves regulate fluid flow of the carrier solution from syringe 132 and/or syringe 134, the diluent from syringe 130, and the matrix solution from syringe 128. In the second mode of operation, the computing system 148 can be configured to reduce fluid flow of the matrix solution until a (predefined or programmed) threshold matrix concentration is achieved.

In some embodiments, a third mode of operation is associated with one or more undiluted samples containing a pre-set concentration of matrix solution. In the third mode of operation, selection valve 136 and other fluidically coupled valves regulate fluid flow of the carrier solution from syringe 132 and/or syringe 134 and the diluent from syringe 130. In the third mode of operation, the computing system 148 can be configured to cause a selected volume of diluent to be introduced to achieve a pre-set final matrix concentration.

In some embodiments, a fourth mode of operation is associated with one or more samples containing a pre-set concentration of matrix solution, where the one or more samples are diluted inline (causing the sample matrix to also be diluted). In the fourth mode of operation, selection valve 136 and other fluidically coupled valves regulate fluid flow of the carrier solution from syringe 132 and/or syringe 134, the diluent from syringe 130, and the matrix solution from syringe 128. In the fourth mode of operation, the computing system 148 can be configured to reduce the fluid flow of the matrix solution when a (predefined or programmed) threshold matrix concentration is achieved.

In some embodiments, a fifth mode of operation is associated with one or more samples containing matrix solution above a pre-set matrix concentration, where the one or more samples are diluted inline (causing the sample matrix to also be diluted). In the fifth mode of operation, selection valve 136 and other fluidically coupled valves regulate fluid flow of the carrier solution from syringe 132 and/or syringe 134, the diluent from syringe 130, and the matrix solution from syringe 128. In the fifth mode of operation, the computing system 148 can be configured to reduce or stop fluid flow of the matrix solution when a (predefined or programmed) threshold matrix concentration is achieved.

In some embodiments, the system 100 is configured to run samples using either: external automatic inline matrix matching (as described above) with three independent syringes for carrier, diluent, and matrix solutions; or automated method of standard additions with three independent syringes for sample, diluent, and spike solutions. Method of Standard Addition (MSA) is an analytical technique that uses a sample as its own "matrix match." Variable spikes of standard are added to the same volume of sample to create a calibration curve in the true sample matrix. The absolute value of the X-intercept is then calculated to be the concentration of an element in the original sample. MSA is considered as the most accurate type of matrix matching, but it requires that a sample be measured multiple times (unspiked and spiked at various concentrations), which significantly reduces sample throughput and increases cost of analysis. However, MSA can be appropriate for samples that require the highest level of accuracy and/or do not have a suitable ultrapure external matrix matching solution.

In some embodiments, the system 100 is further configured to run in a sixth mode of operation for MSA matching, where syringe 128 is configured to drive a spike solution in place of the matrix solution. In the sixth mode of operation, selection valve 136 and other fluidically coupled valves regulate fluid flow of the carrier solution from syringe 132 and/or syringe 134, the diluent from syringe 130, and the spike solution from syringe 128. In the sixth mode of operation, the computing system 148 can be configured to control fluid flow from each syringe according to an MSA algorithm.

Referring to FIG. 7, an auto-sampling system 100 is shown in accordance with an embodiment to provide automatic column sparging by facilitating introduction of an eluent stream having gas bubbles distributed therein to a preconcentration column. As shown the auto-sampling system 100 includes a pump system 102 having a plurality of syringe pumps (syringe pumps 104, 106, 108, and 110 are shown) and includes a valve system 200 having a plurality of selection valves (e.g., rotary valves, where valves 112, 118, and 202 are shown) to combine a flow of gas and a flow of eluent to be introduced to the preconcentration column 114. For instance, a pressure source 204 can supply a stream of gas to the auto-sampling system 100. The pressure source 204 can include, but is not limited to, a syringe-driven gas (e.g., a gas pocket contained within a fluid line 206 coupled to valve 202 driven by a syringe pump), a pressurized gas source (e.g., a pressurized container of gas coupled to valve 202 by fluid line 206, where such pressure to the valve 202 can be regulated by a valve or other regulator, such as a mass flow controller), a peristaltic pump-driven gas (e.g., a gas pocket contained within fluid line 206 coupled to valve 202 driven by a peristaltic pump), a gas/liquid segmented stream introduced through fluid line 206 coupled to valve 202 driven by a pump, such as a syringe pump, peristaltic pump, or other pump. In implementations, the valve 202 is coupled to valve 118 via a line 208 to introduce the gas (or gas/liquid segmented stream) to a port of valve 118. The valve 202 can adopt a first valve configuration (e.g., a channel connecting ports 7 and 8 in FIG. 7) to fluidically couple fluid line 206 and the pressurized gas source with the valve 118. In a second valve configuration of valve 202, valve 118 is not in fluid communication with fluid line 206 and the pressurized gas source, such as through lack of connection between ports 7 and 8 in FIG. 7.

An eluent stream is also introduced to the valve 118, such as through action of syringe pump 106 to push the eluent through line 210 to a port of valve 118. The eluent and the gas are combined in a mixing portion 212 of the valve 118, which can include, but is not limited to, a mixing channel into which the combined gas and eluent streams (e.g., received into valve 118 via lines 208 and 210, respectively) are introduced to produce a bubbled eluent stream. The bubbled eluent stream is directed from the valve 118 to the valve 112 via line 214, where the bubbled eluent stream is then introduced to the preconcentration column 114 fluidically coupled to the valve 112. The bubbled eluent stream travels through the preconcentration column 114 to clean the column interior to assist with washout, such as by removing carryover portions of previously-run samples, standards, resin, or the like. The bubbles provide a synergistic washout process, facilitating greater washout and reduced carryover of materials within the column as compared to introduction of liquid washout solutions alone, or at a rate that exceeds the washout rate of liquid washout solutions alone. After cleaning the preconcentration column 114, the bubbled eluent stream can pass from valve 112 to waste (e.g., from valve 112 to valve 202 via line 216 to waste). The system 100 can then transition to a column conditioning operation or other mode of operation to prepare for a subsequent sample analysis.

It should be recognized that the various functions, control operations, processing blocks, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, a mobile computing device, mainframe computing system, workstation, image computer, parallel processor, or any other device known in the art. In general, the term "computing system" is broadly defined to encompass any device having one or more processors, which execute instructions from a carrier medium.

Program instructions implementing functions, control operations, processing blocks, or steps, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for automated column sparging, comprising:
   a selection valve fluidically coupled with a gas source and with an eluent source, the selection valve including a mixing portion to mix gas from the gas source and eluent from the eluent source to provide a bubbled eluent stream; and
   a preconcentration column in fluid communication with the selection valve, the preconcentration column configured to receive the bubbled eluent stream from the selection valve and direct the bubbled eluent stream into an interior of the preconcentration column.

2. The system of claim 1, wherein the gas source includes a pressurized gas container fluidically coupled with the selection valve.

3. The system of claim 2, further comprising a regulation valve coupled between the pressurized gas container and the selection valve to regulate a flow of gas from the pressurized gas container to the selection valve.

4. The system of claim 2, further comprising a mass flow controller coupled between the pressurized gas container and the selection valve to regulate a flow of gas from the pressurized gas container to the selection valve.

5. The system of claim 1, further comprising a peristaltic pump fluidically coupled with the gas source to drive the gas from the gas source to the selection valve.

6. The system of claim 1, further comprising a syringe pump fluidically coupled with the gas source to drive the gas from the gas source to the selection valve.

7. The system of claim 6, wherein the gas from the gas source is included in a segmented gas and liquid segmented stream driven to the selection valve by the syringe pump.

8. The system of claim 1, further comprising a second selection valve fluidically coupled to the preconcentration column, wherein the preconcentration column is configured to receive the bubbled eluent stream from the selection valve via the second selection valve.

9. The system of claim 8, further comprising a third selection valve fluidically coupled between the gas source and the selection valve.

10. The system of claim 9, wherein the third selection valve is selectable between a first valve configuration and a second valve configuration, wherein the first valve configuration fluidically couples the selection valve and the gas source to transfer the gas from the gas source through the third selection valve to the selection valve.

11. The system of claim 10, wherein the second valve configuration places the selection valve out of fluid communication with the gas source to prevent passage of the gas from the gas source through the third selection valve.

12. The system of claim 9, further comprising a nebulizer fluidically coupled to the third selection valve.

13. A method for automated column sparging, comprising:
- receiving a flow of gas and a flow of eluent at a selection valve;
- combining the flow of gas and the flow of eluent at the selection valve to provide a bubbled eluent stream;
- transferring the bubbled eluent stream from the selection valve to a preconcentration column in fluid communication with the selection valve; and
- directing the bubbled eluent stream through an interior of the preconcentration column.

14. The method of claim 13, further comprising transferring the flow of gas from a pressurized gas container to the selection valve.

15. The method of claim 13, further comprising transferring the flow of gas to the selection valve via a peristaltic pump.

16. The method of claim 13, further comprising transferring the flow of gas to the selection valve via a syringe pump.

17. The method of claim 13, wherein the flow of gas includes a segmented gas and liquid segmented stream.

18. The method of claim 13, wherein transferring the bubbled eluent stream from the selection valve to a preconcentration column in fluid communication with the selection valve includes
- transferring the bubbled eluent stream from the selection valve through a second selection valve fluidically coupled to each of the selection valve and the preconcentration column, and
- transferring the bubbled eluent stream from the second selection valve to the preconcentration column.

19. The method of claim 18, further comprising transferring the flow of gas through a third selection valve to the selection valve when the third selection valve is in a first valve configuration.

20. The method of claim 19, further comprising preventing the transfer of the flow of gas through the third selection valve when the third selection valve is in a second valve configuration.

* * * * *